Figure 1:
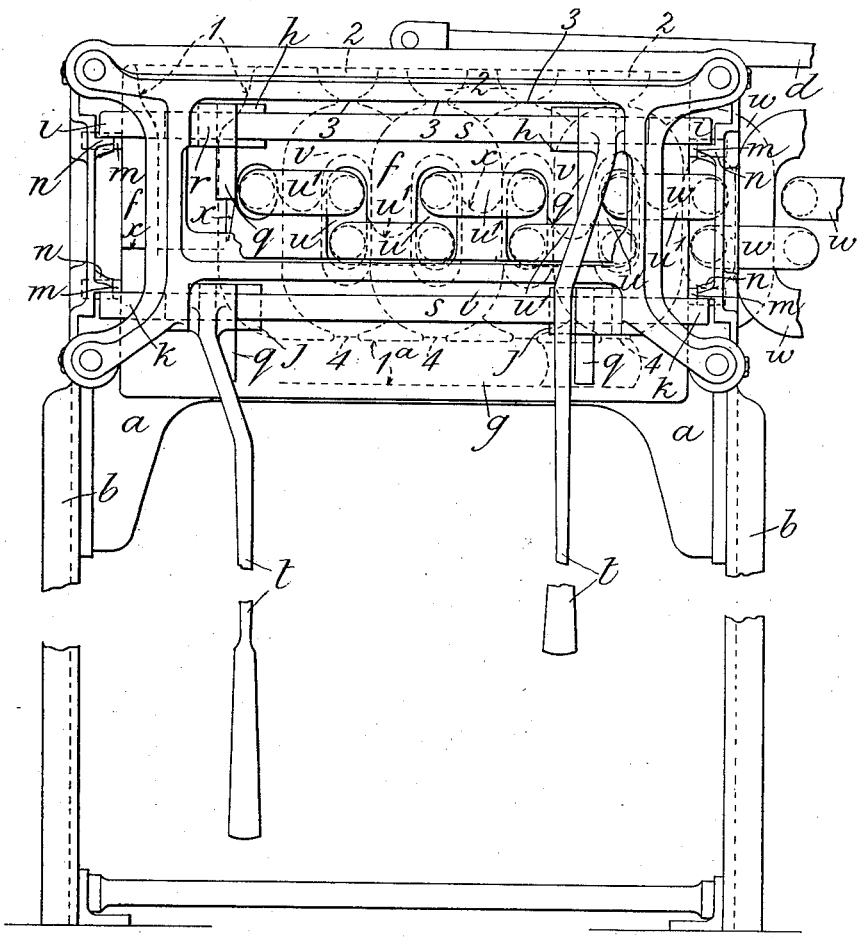

F. S. MORRIS & P. ST. G. KIRKE.
MANUFACTURE OF CHAINS.
APPLICATION FILED AUG. 4, 1911.

1,028,055.

Patented May 28, 1912.
6 SHEETS—SHEET 1.

F. S. MORRIS & P. ST. G. KIRKE.
MANUFACTURE OF CHAINS.
APPLICATION FILED AUG. 4, 1911.

1,028,055.

Patented May 28, 1912.
6 SHEETS—SHEET 4.

F. S. MORRIS & P. ST. G. KIRKE.
MANUFACTURE OF CHAINS.
APPLICATION FILED AUG. 4, 1911.

1,028,055.

Patented May 28, 1912.

6 SHEETS—SHEET 6.

UNITED STATES PATENT OFFICE.

FRANCIS SANDERS MORRIS AND PERCY ST. GEORGE KIRKE, OF WESTMINSTER, ENGLAND.

MANUFACTURE OF CHAINS.

1,028,055.  Specification of Letters Patent.  Patented May 28, 1912.

Application filed August 4, 1911. Serial No. 642,269.

*To all whom it may concern:*

Be it known that we, FRANCIS SANDERS MORRIS and PERCY ST. GEORGE KIRKE, subjects of the King of England, residing at Westminster, England, have invented certain new and useful Improvements Relating to the Manufacture of Chains, of which the following is a specification.

This invention relates to that method of manufacturing chains which consists in disposing previously manufactured links in a metal mold so that they occupy different parallel planes and casting others in the mold so as to interlink them.

The object of the present invention is to effect an improvement in such manufacture by arranging that not only shall the previously formed links occupy different parallel planes in the mold structure but so also shall the mold impressions in which the uniting links are to be cast. In this way, those limbs of the previously manufactured links and of the impressions in the molds for the links to be cast, that in direction correspond to the major axes of the links, can be arranged in such close proximity one to the other in planes transverse to the mold as to enable chains to be produced having links with their ends thickened where the wear and maximum strains occur, such as are used in the British Navy. For this purpose, the mold may be conveniently made in six sections each of which is formed with a part of the requisite impressions for the links to be cast. In order that the molded links may be easily freed from the mold, the latter is preferably opened by toggle levers, and the mold, runners and risers made of partly circular and partly angular section, so that the metal, on cooling, shall not cause the link to grip the mold between its sides and ends but rather to force the mold partly asunder. The mold may be constructed so that each link during casting is inclined to the horizontal or vertical. Also, the mold is so constructed that the molten metal, when poured, is caused to enter at or near the bottom of the mold impressions and displace the air or any gas therein through one or more risers at the top of the molds and so avoid blow holes and flaws in the finished links.

The pouring gate is made of a sufficient height to give a good casting, as is also the riser, both of which may be formed with a constriction to form a groove in the metal casting and facilitate severance of the link therefrom.

In order that the links produced shall have all the elastic properties of the links of approved welded chains and yet have far greater strength per unit length of chain for about the same weight of metal when formed with links having thickened ends, they are preferably made from molten wrought iron, or of molten steel if a less elongation before fracture is permissible and a greater breaking strength is required.

In order that the invention may be more readily understood a mold specially suitable for casting links having thickened ends will now be described with the aid of the accompanying illustrative drawings wherein—

Figure 2:
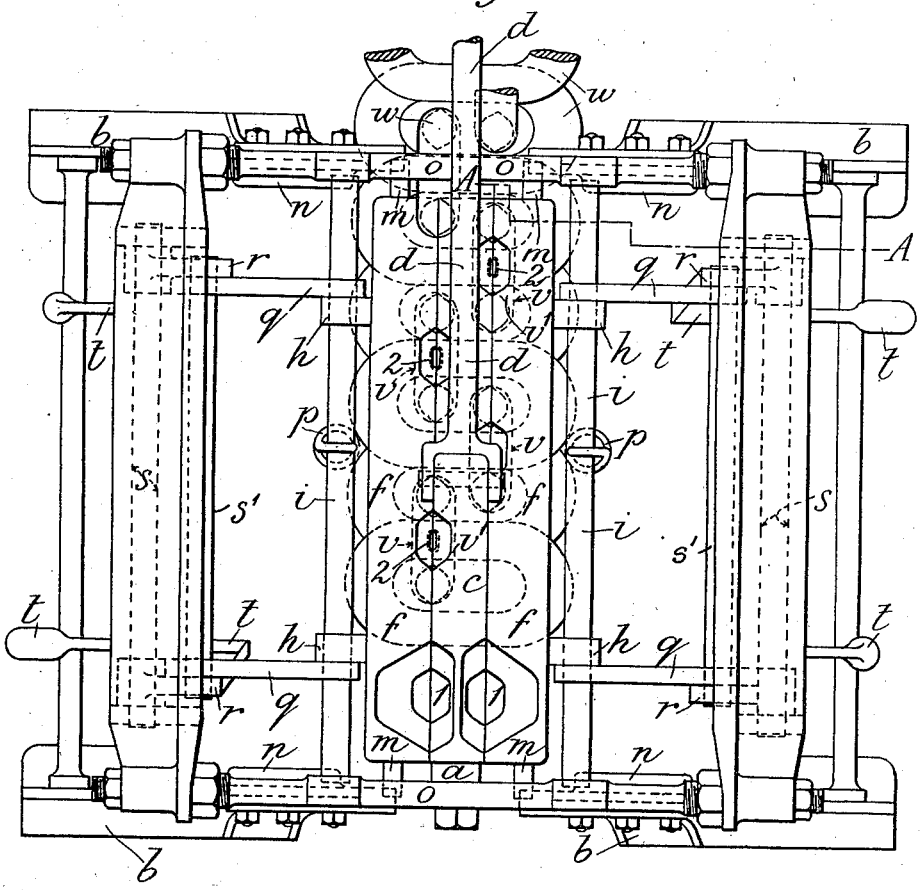
Figure 3:
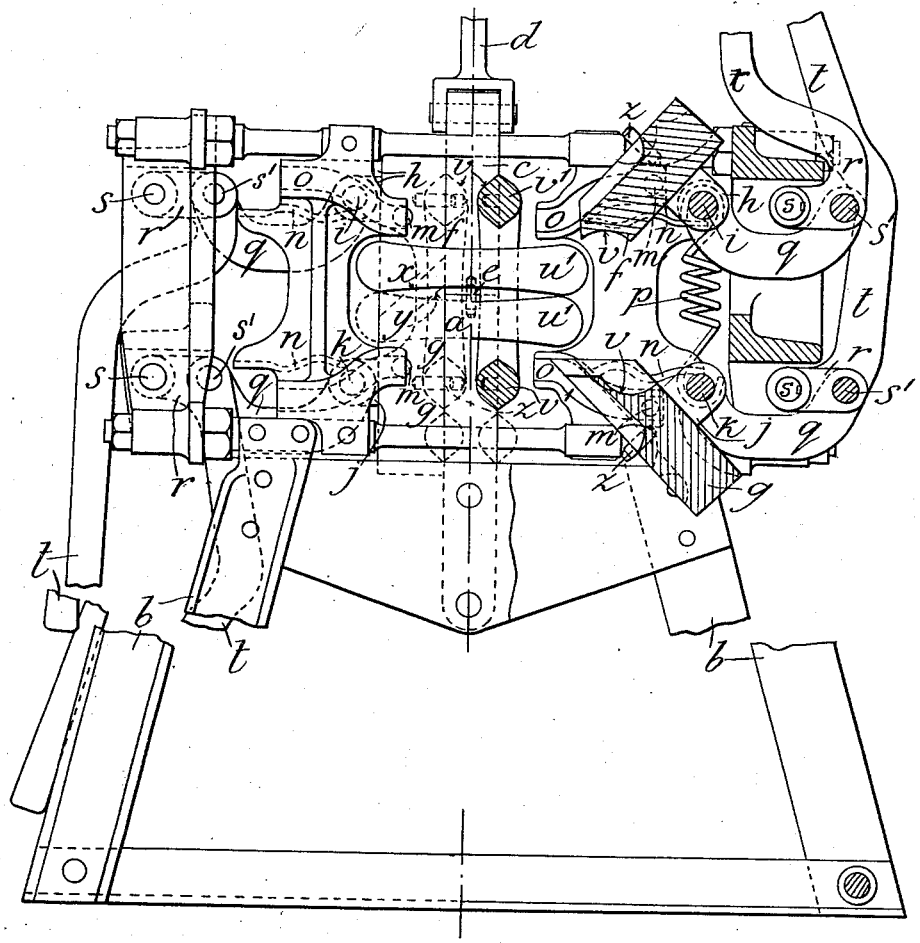
Figure 4:
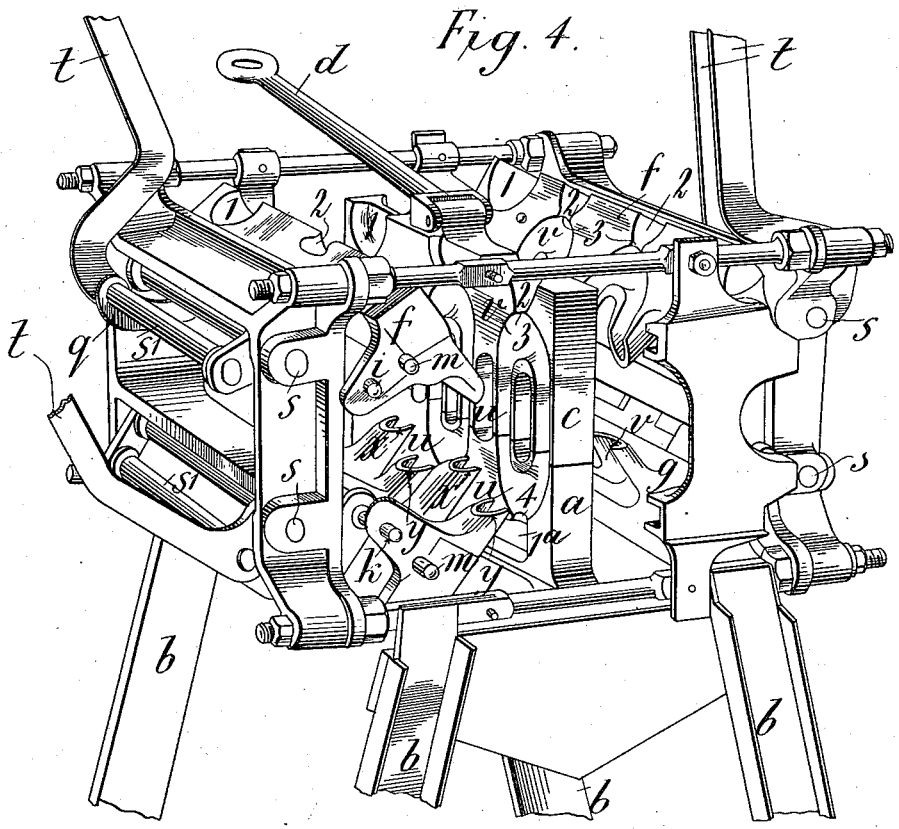
Figure 5:
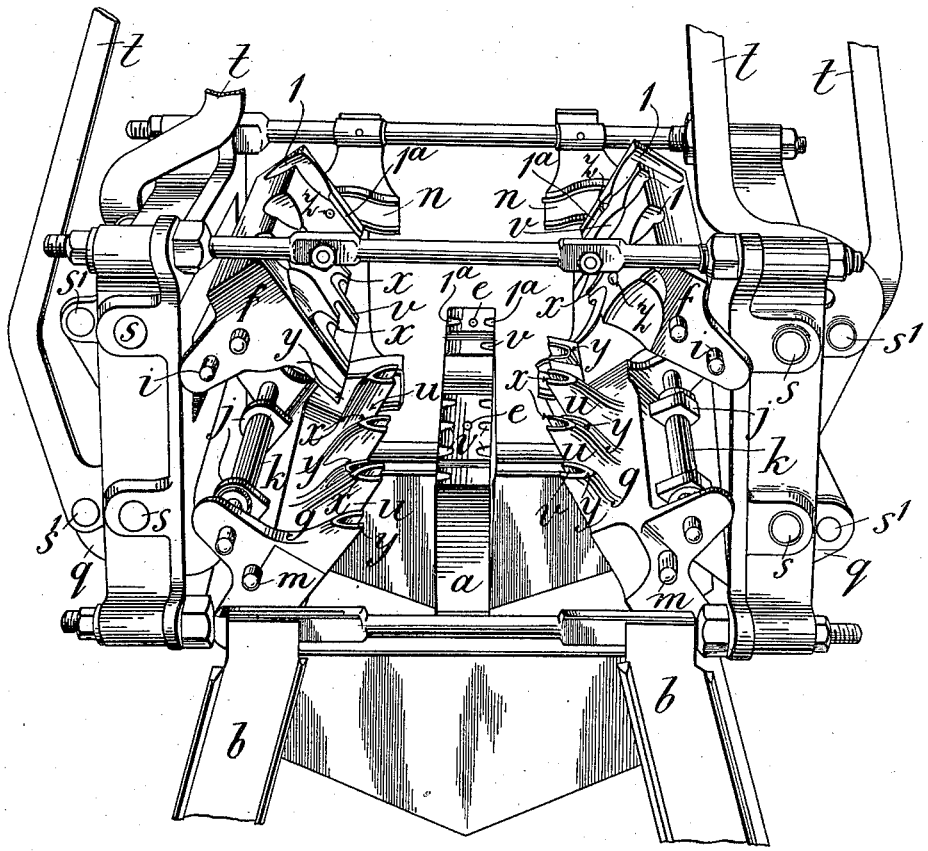
Figure 6:
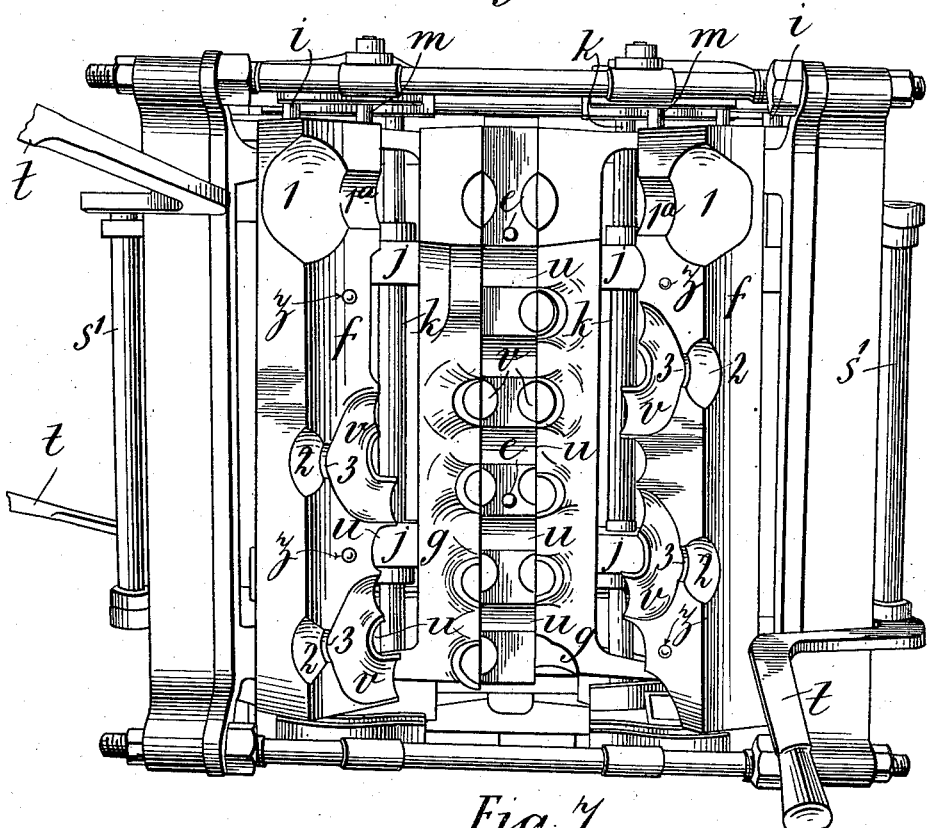
Figure 7:
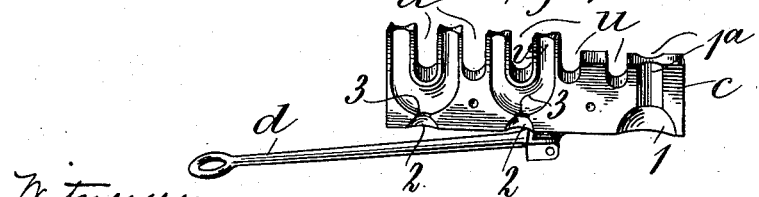

Figure 1 is a side elevation, Fig. 2 a plan and Fig. 3 a view partly in end elevation and partly in section corresponding mainly to the line A A of Fig. 2. Figs. 4 and 5 are perspective elevations and Fig. 6 a perspective plan of the main parts of the machine prior to being closed. Fig. 7 is a perspective view of the element that goes to complete Fig. 6.

As there shown, a lower mold part $a$ is stationarily carried by two frames $b$ while a co-acting upper mold part $c$ is movably carried by a rod $d$ so that it can be brought into engagement with the part $a$ or be separated therefrom, dowels $e$ serving to secure proper register. At each side of the parts $a$ and $c$ are two further mold parts $f$ and $g$, each part $f$ having hinge lugs $h$ working on a rod $i$, while each part $g$ has similar hinge lugs $j$ working on a rod $k$. In addition, each part $f$ and $g$ is fitted at each end with a pin $m$, as more clearly seen in Fig. 2. The parts $f$ and $g$ require at one time to occupy positions such as shown at the right hand side of Fig. 3, and in Figs. 4 and 5 where they are separated, and at another time require to be brought together and into engagement with the parts $a$ and $c$, as shown at the left hand side of Fig. 3, the proper movement of the said parts $f$ and $g$ from one position to the other being secured by providing curved tracks $n$ for the rods $i$ and $k$ and other curved tracks $o$ for the pins $m$. The rods $i$ and $k$ in each pair are conveniently connected by springs $p$ to keep them in engagement with their tracks $n$. The movement of the parts $f$ and $g$ may be effected by various means but preferably it is obtained by toggle arrangements comprising curved links $q$ connected respectively to the rods $i$ and $k$ and at $s^1$ to crank arms $r$ secured to pivot rods $s$, one such crank arm $r$ on each rod $s$ being provided with a lever handle $t$. The action of the toggle arrangements will be obvious from an examination of the right and left hand sides respectively of Fig. 3.

Each of the mold parts $a$, $c$, $f$, $g$ is formed with grooves $v$ so arranged, as shown, that when the said mold parts are brought close together they form two sets of mold impressions arranged in parallel planes near together with the mold impressions in one set overlapping sidewise those in the other set as shown so as to admit of oval links $v^1$ of ordinary standard form and having thickened ends being readily cast therein. The said mold parts are also formed with grooves or recesses so arranged that when the mold parts are brought together they will form passages $u$ for the reception of the already cast links $u^1$ that are to be interlinked by the links to be cast in the mold impressions formed by the grooves $v$.

Assuming a cast to have taken place, then $u^1$ represents the links which were inserted between the mold parts $a$, $c$, $f$, $g$ at starting to be united, $v^1$ represents the links just cast to unite them and $w$ the links previously united. The mold parts $f$ and $g$ are formed with inclined co-acting faces occupying different planes as indicated at $x$ and $y$ in Figs. 1, 3 and 5 and are also provided with dowels $z$ which serve to keep them in proper register with the parts $a$ and $c$. The pressure exerted by the toggle arrangements, when closed, serves to hold all the mold parts firmly together.

A separate pouring gate 1 is provided for each set of links $v^1$ that are in alinement, and, like the mold impressions for such links, are formed, in part, in the blocks $a$ and $c$ and in part in the blocks $f$ and $g$, the course of the runners 1$^a$ from the gates being clearly indicated in dotted lines in Fig. 1, as also are the passages between the gates and mold impressions. In like manner, risers 2 are provided in the mold parts $c$ and $f$, one for each mold impression and link $v^1$. 3 represent the constrictions in the risers and 4 the constrictions where the mold impressions $v$ join the runners 1$^a$, provided for the purpose already referred to. These constrictions are preferably made long and narrow to facilitate the removal of the runners and risers from the cast links.

Some of the wrought iron or steel links of a chain, for example the alternate links, may be manufactured by a different process to that hereinbefore described. For instance, they may be produced by drop forging, or by being cut or pressed out of solid metal, and the scrap from such manufacture may be used for casting the links $v^1$ for connecting up such pressed or cut links.

The links may be made long or short and with or without intermediate stays, and such stays, if any, may or may not form an integral part of the links.

What we claim is:—

1. A chain casting mold comprising outer and intermediate separable sections the intermediate sections having a set of impressions at one side and another set of impressions at the other side in staggered relationship to the first named set, while the outer sections have companion impressions, the several impressions being adapted when the sections are assembled, to permit links to be cast that occupy different parallel planes and overlap each other sidewise, for the purpose specified.

2. A chain casting mold comprising outer and intermediate separable sections formed with transverse gaps to embrace previously manufactured links, the intermediate sections having a set of impressions at one side and another set of impressions at the other side in staggered relationship to the first named set, while the outer sections have companion impressions, the several impressions being adapted, when the sections are assembled, to permit links to be cast that occupy different parallel planes and overlap each other so as to interlink the previously manufactured links.

3. A chain casting mold comprising a stationary bottom section having passages to enable links to be disposed transversely thereof, a removable section surmounting said bottom section, and a pair of movable sections disposed at each side of the bottom section and its companion, the said several sections being formed with impressions adapted, when assembled, to permit links to be cast that occupy different parallel planes and overlap each other so as to interlink the links placed in the mold.

4. A chain casting machine comprising a stationary bottom mold section, a bodily removable upper mold section surmounting the former, a pair of movable sections disposed at each side of the bottom and upper sections and toggle locking means adapted to move the side sections toward and from the intermediate sections to close and open the mold.

5. A chain casting machine comprising a stationary bottom mold section, a bodily removable upper mold section surmounting the former, a pair of movable sections disposed at each side of the bottom and upper sections, toggle locking means adapted to move the side section toward and from the intermediate sections to close and open the mold and means associated with the side sections coöperating with stationary cam grooves adapted to guide the said side sections in their correct path during such opening and closing of the mold.

6. A chain casting machine comprising a stationary bottom mold section, a bodily removable upper mold section surmounting the former, and a pair of movable sections disposed at each side of the bottom and upper sections aforesaid, the several sections being formed with impressions adapted to enable links to be cast that occupy different parallel planes and overlap each other, and with gaps intermediate of the impressions adapted to receive previously manufactured links intended to be interlinked with the links being cast.

7. A chain casting machine comprising a stationary bottom mold section, a bodily removable upper mold section surmounting the former, a section at each side of the bottom section, and a section on each side of the upper section and toggle locking means adapted to permit each of the side sections to be independently moved toward or from the intermediate bottom and upper sections.

8. A chain casting machine comprising a stationary bottom mold section, a bodily removable upper mold section surmounting the former, a section at each side of the bottom section, and a section on each side of the upper section, the said several sections being each formed with impressions adapted when assembled to enable links to be cast that occupy different parallel planes and overlap each other.

9. A chain casting machine comprising a stationary bottom mold section, a bodily removable upper mold section surmounting the former, a section at each side of the bottom section, and a section on each side of the upper section, the said several sections being formed with impressions adapted to enable links to be cast that occupy different parallel planes and overlap each other and with passages intermediate of the impressions adapted to receive previously manufactured links intended to be interlinked with the links being cast.

10. A chain casting mold comprising outer and intermediate separable sections, the intermediate sections having at one side a set of impressions that are partly circular and partly angular in cross section, and at the other side another set of similar impressions in staggered relationship to the first named set, while the outer sections have companion impressions, the several impressions being adapted when the sections are assembled, to permit links to be cast that occupy different parallel planes and overlap each other sidewise.

11. A chain casting machine comprising a stationary mold section having part link impressions at opposite sides thereof, a runner below the link impressions at each such side and in restricted communication with the bottom of each impression, an upper removable mold section having at each side part link impressions in register with the link impressions in the stationary section, a part gate and a part runner placing the gate in communication with the corresponding part runners in the said stationary sections, means for moving the upper section to and from the stationary mold section, a pair of laterally movable mold sections respectively provided with part link impressions, runners and gate corresponding to those at one side of the stationary and upper sections, another pair of similar laterally movable sections at the opposite side of the stationary and upper sections and means for moving the two pairs of side sections into and out of engagement with the stationary and upper sections.

Signed at London, England, this 25th day of July, 1911.

FRANCIS SANDERS MORRIS.
PERCY ST. GEORGE KIRKE.

Witnesses:
H. D. JAMESON,
ROY SANDERSON.

---

Copies of this patent may be obtained for five cents each, by addressing the "Commissioner of Patents, Washington, D. C."